US010276076B2

(12) United States Patent
Zhang (10) Patent No.: US 10,276,076 B2
(45) Date of Patent: Apr. 30, 2019

(54) MURA OFFSET DATA INPUT DEVICE AND METHOD THEREOF (71) Applicant: Shenzhen China Star Optoelectronics Technology Co., Ltd., Shenzhen, Guangdong (CN)

(72) Inventor: Hua Zhang, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 230 days.

(21) Appl. No.: 14/905,239

(22) PCT Filed: Dec. 17, 2015

(86) PCT No.: PCT/CN2015/097679
§ 371 (c)(1),
(2) Date: Jan. 14, 2016

(87) PCT Pub. No.: WO2017/080014
PCT Pub. Date: May 18, 2017

(65) Prior Publication Data
US 2017/0256187 A1    Sep. 7, 2017

(30) Foreign Application Priority Data

Nov. 11, 2015  (CN) .......................... 2015 1 0764877

(51) Int. Cl.
G09G 3/00      (2006.01)
G09G 3/36      (2006.01)
(Continued)

(52) U.S. Cl.
CPC ......... *G09G 3/006* (2013.01); *G06F 13/4068* (2013.01); *G06F 13/4282* (2013.01);
(Continued)

(58) Field of Classification Search
CPC .. G09G 3/006; G09G 3/36; G09G 2320/0233; G09G 2360/12;
(Continued)

(56) References Cited

U.S. PATENT DOCUMENTS 8,743,215 B1 *  6/2014  Lee .................... G09G 3/006
                                              348/180
8,909,852 B1 * 12/2014  Kim ................... G06F 12/1416
                                              711/103

(Continued)

*Primary Examiner* — Grant Sitta
(74) *Attorney, Agent, or Firm* — Andrew C. Cheng (57) ABSTRACT

The present invention discloses a Mura offset data input device, including a Mura offset chip, a first memory unit, a second memory unit, a connector and a control circuit, the Mura offset chip is connected to the first memory unit, the second memory unit and the connector, the connector and the first memory unit are connected, the connector and the second memory unit are connected by the control circuit, the first memory unit and the second memory unit both include two operative modes—an editable mode and a read-only mode, the control circuit is applied to control the first memory unit and the second memory unit that are in different modes, the connector is applied to transfer first data to the first memory unit when the first memory unit is editable, and transfer second data to the second memory unit by the Mura offset chip.

18 Claims, 3 Drawing Sheets

(51) Int. Cl.
*G06F 13/40* (2006.01)
*G06F 13/42* (2006.01)

(52) U.S. Cl.
CPC ............ *G09G 3/36* (2013.01); *G09G 2310/08* (2013.01); *G09G 2320/0233* (2013.01); *G09G 2360/02* (2013.01); *G09G 2360/12* (2013.01)

(58) Field of Classification Search
CPC ............ G09G 2310/08; G09G 2360/02; G06T 5/002; G06T 5/005; G06T 5/001; G06T 5/003; G06F 13/4282; G06F 13/4068
USPC .......................................................... 345/89
See application file for complete search history.

(56) References Cited

U.S. PATENT DOCUMENTS

| | | | | |
|---|---|---|---|---|
| 9,423,855 B2* | 8/2016 | Fang | ................... | G06F 1/3206 |
| 9,514,713 B2* | 12/2016 | Lee | ................... | G09G 5/18 |
| 2006/0028419 A1* | 2/2006 | Lee | ................... | G09G 3/3648 |
| | | | | 345/98 |
| 2006/0082584 A1* | 4/2006 | Noorbakhsh | ........... | G09G 5/006 |
| | | | | 345/531 |
| 2007/0164970 A1* | 7/2007 | Oh | ................... | G09G 3/2096 |
| | | | | 345/99 |
| 2008/0126675 A1* | 5/2008 | Fu | ................... | G06F 12/1425 |
| | | | | 711/103 |
| 2008/0288818 A1* | 11/2008 | Lai | ................... | G06F 1/305 |
| | | | | 714/15 |
| 2009/0083486 A1* | 3/2009 | Chen | ................... | G06F 11/2733 |
| | | | | 711/115 |
| 2009/0222807 A1* | 9/2009 | Fu | ................... | G06F 8/65 |
| | | | | 717/168 |
| 2010/0131707 A1* | 5/2010 | Chi | ................... | G06F 13/385 |
| | | | | 711/115 |
| 2010/0265785 A1* | 10/2010 | Lee | ................... | G11C 5/005 |
| | | | | 365/229 |
| 2011/0317067 A1* | 12/2011 | Hsieh | ................... | G09G 5/006 |
| | | | | 348/441 |
| 2011/0320853 A1* | 12/2011 | Maruko | ................... | G06F 1/10 |
| | | | | 713/500 |
| 2012/0110245 A1* | 5/2012 | Wu | ................... | G11C 5/143 |
| | | | | 711/103 |
| 2012/0221766 A1* | 8/2012 | Yeh | ................... | G06F 12/00 |
| | | | | 711/103 |
| 2013/0219109 A1* | 8/2013 | Kim | ................... | G06F 12/0246 |
| | | | | 711/103 |
| 2014/0119115 A1* | 5/2014 | Jung | ................... | G11C 11/5628 |
| | | | | 365/185.03 |
| 2014/0285540 A1* | 9/2014 | Wu | ................... | G09G 3/36 |
| | | | | 345/691 |
| 2015/0187427 A1* | 7/2015 | Oh | ................... | G11C 16/22 |
| | | | | 345/212 |
| 2015/0248873 A1* | 9/2015 | Tanaka | ................... | G09G 5/18 |
| | | | | 345/213 |
| 2015/0326046 A1* | 11/2015 | Song | ................... | H02J 7/0052 |
| | | | | 320/107 |
| 2015/0363353 A1* | 12/2015 | Enami | ................... | G06F 13/4282 |
| | | | | 710/110 |
| 2016/0132451 A1* | 5/2016 | Cho | ................... | G06F 13/4004 |
| | | | | 710/110 |
| 2016/0155421 A1* | 6/2016 | Han | ................... | G09G 5/12 |
| | | | | 345/213 |

* cited by examiner

FIG. 1

(Related art)

(Related art)

MURA OFFSET DATA INPUT DEVICE AND METHOD THEREOF

CROSS REFERENCE

This application claims the priority of Chinese Patent Application No. 201510764877.2, entitled "Mura offset data input device and method thereof", filed on Nov. 11, 2015, the disclosure of which is incorporated herein by reference in its entirety.

FIELD OF THE INVENTION

The present invention relates to a liquid crystal display technology field, and more particularly to a Mura offset data input device and a method thereof.

BACKGROUND OF THE INVENTION

Manufactured liquid crystal display (LCD) panels can be brightness uneven because of the deficiency during fabrication, and various Mura flaws can be formed. In order to improve the uniformity of brightness of LCD panels, a Mura offset method has been offered, a Mura pattern of gray-scale images (pure white images of different brightness) is shot by a camera, contrast of brightness between a frame of a LCD panel and a central region is calculated by comparing the brightness of the central region of the LCD panel, and brightness uniformity of the LCD panel can beachieved by offset gray-scale values on the Mura position adversely. For example, gray-scale values in regions where are brighter than the central position are reduced to fadethe brightness; gray-scale values in regions where are dimmer than the central position are increased to light the regions.

Figure 1:
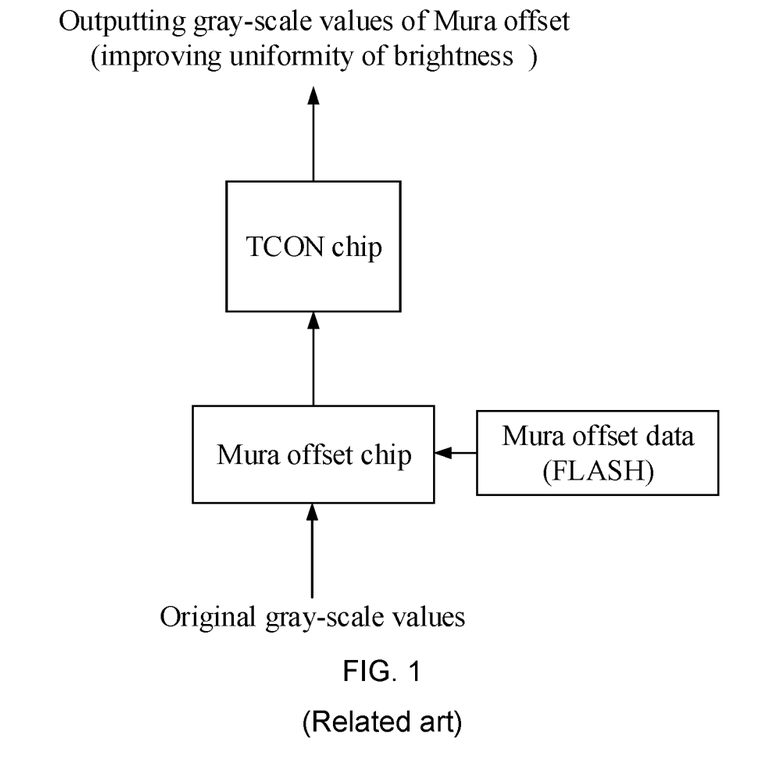
FIG. 1 is a principle diagram of realizing a conventional Mura offset function.
Figure 2:
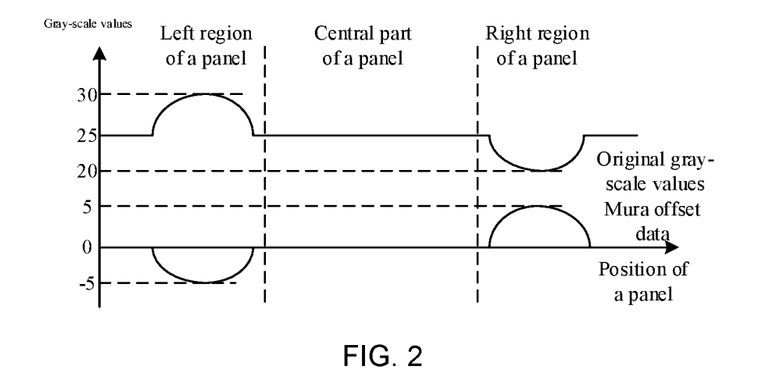
FIG. 2 is a comparison diagram of original gray-scale data and Mura offset data.
Figure 3:
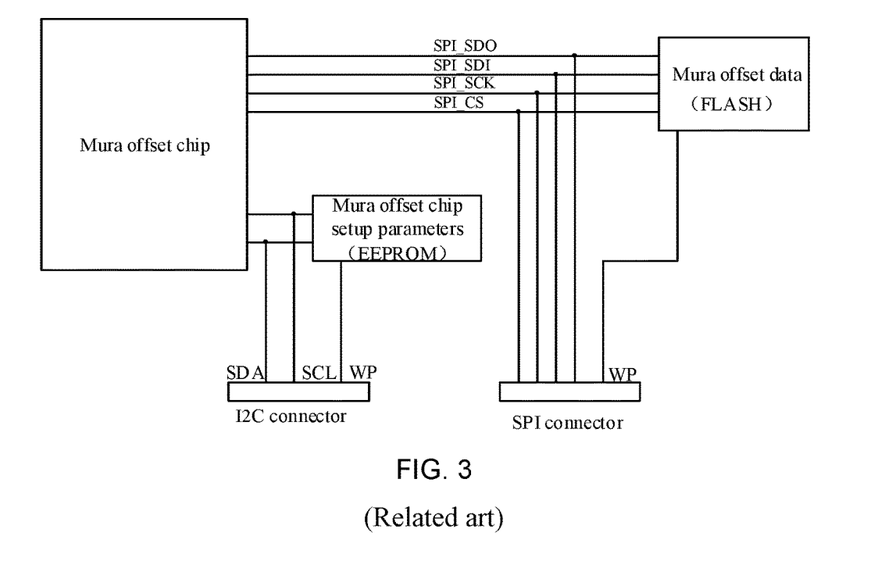
FIG. 3 is a structural diagram of a conventional Mura offset data input device.

A timing controller (TCON) chip supporting full high definition (FHD) with a resolution of 1920×1080 on the market has not integrated a function of Mura offset. Therefore, in LCD panels with FHD resolution, the function of Mura offset is carried out by combining a separated Mura offset chip and a TCON chip. As shown in FIG. 1 and FIG. 2, the Mura offset chip calculates difference between the brightness of the frame of a LCD panel and the central region and reads the corresponding Mura offset data from FLASH memory to control gray-scale data of the TCON chip after exporting Mura offset, completing offset to a LCD panel. In the proposal above, the Mura offset chip needs to be accompanied with two data memory: one is an electrically erasable programmable read-only memory (EEPROM) with an inter-integrated circuit (I2C) interface, which is applied to store setup parameters of the Mura offset chip; the other one is FLASH memory with a serial peripheral interface (SPI), which is applied to store Mura offset data. As shown in FIG. 3, when inputting data into the two data memory, two different connectors and data files are necessary to write data into the two data memory respectively, which makes the process too complex and time consuming.

SUMMARY OF THE INVENTION

According to the conventional technical issue above, the invention provides a Mura offset data input device to import setup parameters of a Mura offset chip and Mura offset data by reapplying a connector, which can simplify the process of inputting Mura offset data and improve efficiency of data input, as well as cutting costs of manufacture.

Furthermore, the invention further provides a Mura offset data input method.

A Mura offset data input device includes a Mura offset chip, a first memory unit, a second memory unit, a connector and a control circuit, the Mura offset chip is connected to the first memory unit, the second memory unit and the connector electrically, the connector and the first memory unit are connected electrically, the connector and the second memory unit are connected electrically by the control circuit, the first memory unit and the second memory unit both include two operative modes—an editable mode and a read-only mode, the control circuit is applied to control the first memory unit and the second memory unit that are in different modes, the connector is applied to transfer first data to the first memory unit when the first memory unit is editable, and transfer second data to the second memory unit by the Mura offset chip when the second memory unit is editable.

The Mura offset chip includes a first communication interface, the first memory unit includes a first I/O interface and a first protection interface, the connector includes a data input interface and an I/O control interface; the first communication interface and the first I/O interface are connected; the data input interface is connected to the first communication interface and the first I/O interface; the I/O control interface and the first protection interface are connected.

The Mura offset chip further includes a second communication interface, the second memory unit includes a second I/O interface and a second protection interface, the second communication interface and the second I/O interface are connected, the I/O control interface is connected to the second protection interface by the control circuit, the control circuit is applied to control the first memory unit and the second memory unit that are in different modes.

The control circuit includes a transistor, a first resistance and a second resistance, the transistor includes a grid electrode, a source electrode and a drain electrode, the grid electrode and the I/O control interface are connected; the source electrode is applied to receive control signals of a first electrical level; one end of the first resistance and the source electrode are connected, the other end is connected to the I/O control interface; the drain electrode and the second protection interface are connected; one end of the second resistance is connected to the drain electrode and the second protection interface, the other end is connected to ground.

The transistor is a P-type metal-oxide-semiconductor field-effect transistor.

The first I/O interface is applied to transfer the first data to the first memory unit; the first protection interface is applied to receive control signals of the first electrical level or a second electrical level, when the first protection interface receives control signals of the first electrical level, the first memory unit is editable, when the first protection interface receives control signals of the second electrical level, the first memory unit is read-only.

When the I/O control interface exports control signals of the first electrical level, the first memory unit is editable, the second memory unit is read-only; the data input interface inputs first data, the first data is stored into the first memory unit by the first I/O interface.

The second I/O interface is applied to transfer the second data to the second memory unit; the second protection interface is applied to receive control signals of the first electrical level or the second electrical level, when the second protection interface receives control signals of the first electrical level, the second memory unit is editable, when the second protection interface receives control signals of the second electrical level, the second memory unit is read-only.

When the I/O control interface exports control signals of the second electrical level, the first memory unit is read-only, the second memory unit is editable; the data input interface receives second data, the second data is transferred to the Mura offset chip by the first communication interface, and exported to the second I/O interface by the second communication interface, and stored in the second memory unit by the second I/O interface.

A Mura offset data input method includes: an I/O control interface of a connector exporting control signals of a first electrical level, manipulating a first memory unit to be editable; a control circuit converting control signals of the first electrical level to control signals of a second electrical level, manipulating the second memory unit to be read-only; data input interface of the connector inputting first data, the first data stored into the first memory unit by a first I/O interface; an I/O control interface of the connector exporting controls signals of a second electrical level, manipulating the first memory unit to be read-only; the control circuit converting controls signals of the second electrical level to control signals of the first electrical level, manipulating the second memory unit to be editable; data input interface of the connector importing second data, the second data transferred to a Mura offset chip by a first communication interface; the Mura offset chip exporting the second data to a second I/O interface by a communication interface, and stored in the second memory unit by the second I/O interface.

The Mura offset chip includes a first communication interface, the first memory unit includes a first I/O interface and a first protection interface, the connector includes a data input interface and a I/O control interface; the first communication interface and the first I/O interface are connected; the data input interface is connected to the first communication interface and the first I/O interface; the I/O control interface and the first protection interface are connected.

The Mura offset chip further includes a second communication interface, the second memory unit includes a second I/O interface and a second protection interface, the second communication interface and the second I/O interface are connected, the I/O control interface is connected to the second protection interface by the control circuit, the control circuit is applied to control the first memory unit and the second memory unit that are in different modes.

The control circuit includes a transistor, a first resistance and a second resistance, the transistor comprises a grid electrode, a source electrode and a drain electrode, the grid electrode and the I/O control interface are connected; the source electrode is applied to receive control signals of a first electrical level; one end of the first resistance and the source electrode are connected, the other end is connected to the I/O control interface; the drain electrode and the second protection interface are connected; one end of the second resistance is connected to the drain electrode and the second protection interface, the other end is connected to ground.

The transistor is a P-type metal-oxide-semiconductor field-effect transistor.

The first I/O interface is applied to transfer the first data to the first memory unit; the first protection interface is applied to receive control signals of the first electrical level or a second electrical level, when the first protection interface receives control signals of the first electrical level, the first memory unit is editable, when the first protection interface receives control signals of the second electrical level, the first memory unit is read-only.

When the I/O control interface exports control signals of the first electrical level, the first memory unit is editable, the second memory unit is read-only; the data input interface inputs first data, the first data is stored into the first memory unit by the first I/O interface.

The second I/O interface is applied to transfer the second data to the second memory unit; the second protection interface is applied to receive control signals of the first electrical level or the second electrical level, when the second protection interface receives control signals of the first electrical level, the second memory unit is editable, when the second protection interface receives control signals of the second electrical level, the second memory unit is read-only.

When the I/O control interface exports control signals of the second electrical level, the first memory unit is read-only, the second memory unit is editable; the data input interface receives second data, the second data is transferred to the Mura offset chip by the first communication interface, and exported to the second I/O interface by the second communication interface, and stored in the second memory unit by the second I/O interface.

The connector is set to be connected with the first memory unit electrically by the Mura offset data input device, and the Mura offset data input device is connected to the second memory unit electrically by the control circuit, the control circuit is applied to control the first memory unit and the second memory unit that are in different modes, first data is stored into the first memory unit by the connector when the first memory unit is editable, second data is stored in the second memory unit by the Mura offset chip when the second memory unit is editable, which can reapply the connector and simplify the structure of the Mura offset data input device as well as the process of inputting Mura offset data, resulting in improving efficiency of data input and cutting costs of manufacture.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

For convenience of description, directional terms such as "top", "bottom", "below", "on", "over" etc. are used with reference to the orientation of the Figure(s) being described. A component or a layer of the present invention can be positioned on, linked to or coupled to another component or layer directly when using "on", "linked to" or "coupled to", or inserting components or layers can exist. On the contrary, when "direct" or "directly" is employed, inserting components or layers are absent.

As such, the terms are used for purposes of illustration and should not be regarded as limiting. Examples and the appended claims be implemented in the present invention require the use of the singular forms "an" and "the" are intended to include most forms unless the context clearly dictates otherwise. The use of "including," "comprising," or "having" and variations thereof herein is meant to encompass the items listed thereafter and equivalents thereof as well as additional items.

It is to be understood that the phraseology and terminology used herein can be mastered by those of ordinary skill in the art. In other words, the terms can be looked up in a dictionary, otherwise they should be explained in a specific field, other than abstract meanings, unless being defined as such.

Figure 4:
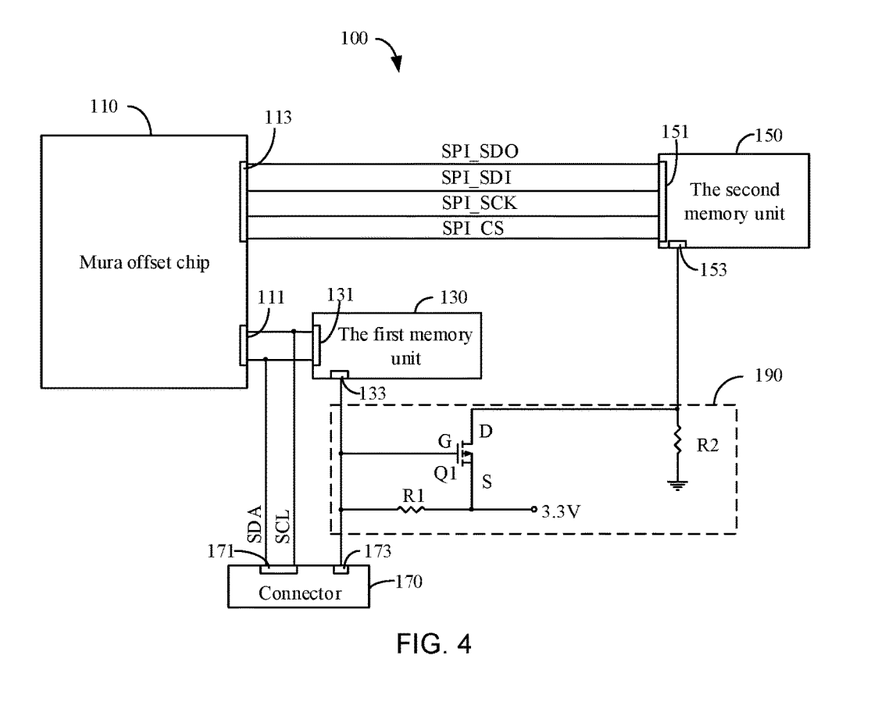
FIG. 4 is a structural diagram of a Mura offset data input device according to an exemplary embodiment of the invention.

Referring to FIG. 4, a Mura offset data input device 100 according to an exemplary embodiment of the invention, which is applied in a liquid crystal display (LCD) to offset Mura of a LCD and improve brightness uniformity of a LCD.

The Mura offset data input device 100 includes a Mura offset chip 110, a first memory unit 130, a second memory unit 150, a connector 170 and a control circuit 190. The Mura offset chip 110 is connected to the first memory unit 130, the second memory unit 150 and the connector 170 electrically. The connector 170 and the first memory unit 130 are connected electrically, the connector 170 and the second memory unit 150 are connected electrically by the control circuit 190, the first memory unit 130 and the second memory unit 150 both include two operative modes—an editable mode and a read-only mode. The control circuit 190 is applied to control the first memory unit 130 and the second memory unit 150 that are in different modes, for instance, when the first memory unit 130 is read-only, the second memory unit 150 is controlled to be editable. The connector 170 is applied to transfer first data to the first memory unit 130 when the first memory unit 130 is editable; and second data is imported to the second memory unit 150 by the Mura offset chip 110 when the second memory unit 150 is editable manipulated by the control circuit 190.

Specifically, the Mura offset chip 110 includes a first communication interface 111 and a second communication 113. The first memory unit 130 includes a first I/O interface 131 and a first protection interface 133; the first I/O interface 131 is applied to import the first data to the first memory unit 130 or read the first data from the first memory unit 130 where it is stored; the first protection interface 133 is applied to receive control signals of a first electrical level or a second electrical level, when the first protection interface 133 receives control signals of the first electrical level, the first memory unit 130 is editable, when the first protection interface 133 receives control signals of the second electrical level, the first memory unit 130 is read-only. The second memory unit 150 includes a second I/O interface 151 and a second protection interface 153; the second I/O interface 151 is applied to import the second data to the second memory unit 150 or read the second data from the second memory unit 150 where it is stored; the second protection interface 153 is applied to receive control signals of a first electrical level or a second electrical level, when the second protection interface 153 receives control signals of the first electrical level, the second memory unit 150 is editable, when the second protection interface 153 receives control signals of the second electrical level, the second memory unit 150 is read-only. The connector 170 includes a data input interface 171 and an I/O control interface 173; the data input interface 171 is applied to input the first data or the second data; the I/O control interface 173 is applied to export control signals of the first electrical level or the second electrical level. The data input interface 171 is connected to the first communication interface 111 and the first I/O interface 131; the I/O control interface 173 and the first protection interface 133 are connected, the I/O control interface 173 is connected to the second protection interface 153 by the control circuit 190; the control circuit 190 is applied to convert control signals of the first electrical level from the I/O control interface 173 to that of the second electrical level. The first I/O interface 131 and the first communication interface 111 are connected; the second communication interface 113 and the second I/O interface 151 are connected. In the exemplary embodiment, control signals of the first electrical level are voltage signals of high level, such as a voltage signal of 3.3V; control signals of the second electrical level are voltage signals of low level, such as a voltage signal of 0V. Similarly, control signals of the first electrical level can be voltage signals of low level, correspondingly, control signals of the second electrical level can also be voltage signals of high level.

In the exemplary embodiment, the first communication interface 111 is an inter-integrated circuit (I2C) interface, the second communication interface 113 is a serial peripheral interface (SPI); the first memory unit 130 is electrically erasable programmable read-only memory (EEPROM) of an I2C interface, the first I/O interface 131 is an I2C interface; the first data is a setup parameter of the Mura offset chip 110, the first data is applied to set up an operational parameter of the Mura offset chip 110; the second memory unit 150 is a FLASH memory unit with a SPI interface, the second I/O interface 151 is a SPI interface; the second data is Mura offset data, the second data is applied to provide gray-scale data offset to a LCD with Mura flaw; the connector 170 is an I2C connector, the data input interface 171 is an I2C interface. As shown in FIG. 4, the first communication interface 111, the first I/O interface 131 and the data input interface 171 are connected by a data line SDA and a clock line SCL, the data line SDA is applied to transfer data, such as the first data or the second data, the clock line SCL is applied to transfer data I/O clock signals; the second communication interface 113 and the second I/O interface 151 are connected by an output data line SPI_SDO, an input data line SPI_SDI, a clock line SPI_SCK and an enable signal line SPI_CS, the output data line SPI_SDO is applied to export the second data to the second memory unit 150, the input data line SPI_SDI is applied to read the second data from the second memory unit 150, the clock line SPI_SCK is applied to transfer data I/O clock signals, the enable signal line SPI_CS is applied to transfer I/O enable signals.

The control circuit 190 includes a transistor Q1, a first resistance R1 and a second resistance R2. The transistor Q1 is a P-type metal-oxide-semiconductor field-effect transistor (MOSFET), including a grid electrode G, a source electrode Sand a drain electrode D, the grid electrode G and the I/O control interface 173 are connected; the source electrode S is applied to receive control signals of a first electrical level (a voltage signal of 3.3V in the exemplary embodiment); one end of the first resistance R1 and the source electrode S are connected, the other end is connected to the I/O control interface 173; the drain electrode D and the second protection interface 153 are connected; one end of the second resistance R2 is connected to the drain electrode D and the second protection interface 153, the other end is connected to ground.

When the I/O control interface 173 outputs control signals of a first electrical level (3.3V), voltages of the grid electrode G and the source electrode S are the same, and the transistor Q1 is cut off, the first protection interface 133 receives control signals of the first electrical level, the first memory unit 130 is editable, the second protection interface 153 receives control signals of the second electrical level, the second memory unit 150 is read-only; the data input interface 171 inputs the first data, the first data is stored in the first memory unit 130 by the first I/O interface 131. When the first data is totally stored, the I/O control interface 173 outputs control signals of the second electrical level (0V), a voltage of the grid electrode G is 0V, a voltage of the source electrode S is 3.3V, the transistor Q1 is working, the first protection interface 133 receives control signals of the second electrical level, the first memory unit 130 is read-only, the second protection interface 153 receives control signals of the first electrical level, the second memory unit 150 is editable; the data input interface 171 inputs the second data, the second data is transferred to the Mura offset chip 110 by the first communication interface 111, and exported to the second I/O interface 151 by the second communication interface 113, and stored in the second memory unit 150 by the second I/O interface 151.

Figure 5:
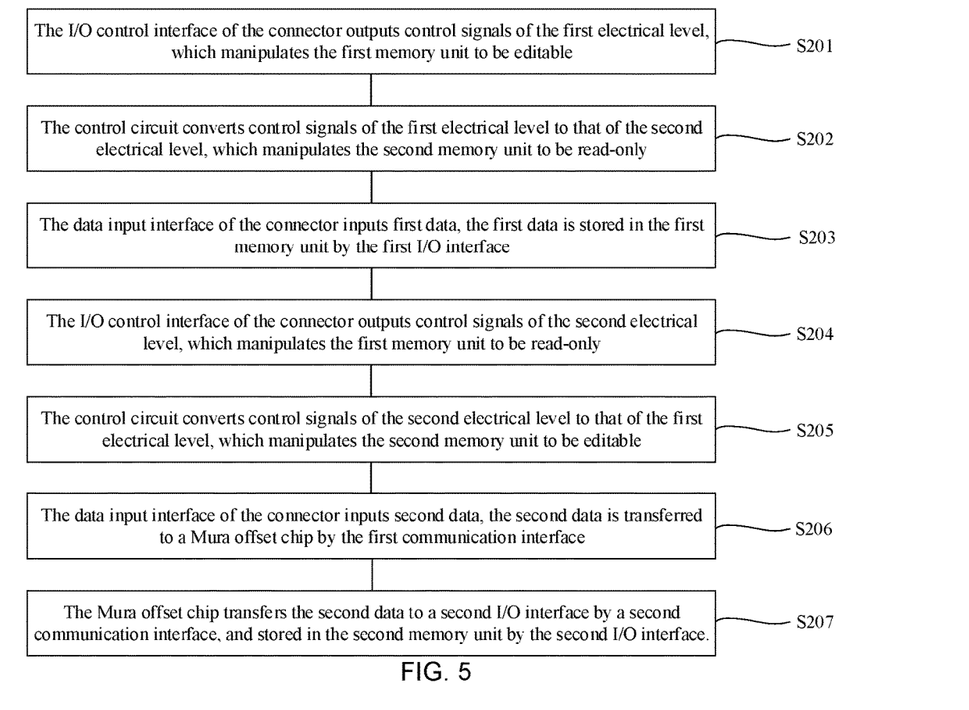
FIG. 5 is a flow chart of a Mura offset data input method according to an exemplary embodiment of the invention.

Referring to FIG. 5, an exemplary embodiment of the invention further provides a Mura offset data input method, the method as least includes the following steps:

Step S201: The I/O control interface of the connector outputs control signals of the first electrical level, which manipulates the first memory unit to be editable;

Step S202: The control circuit converts control signals of the first electrical level to that of the second electrical level, which manipulates the second memory unit to be read-only;

Step S203: The data input interface of the connector inputs first data, the first data is stored in the first memory unit by the first I/O interface;

Step S204: The I/O control interface of the connector outputs control signals of the second electrical level, which manipulates the first memory unit to be read-only;

Step S205: The control circuit converts control signals of the second electrical level to that of the first electrical level, which manipulates the second memory unit to be editable;

Step S206: The data input interface of the connector inputs second data, the second data is transferred to a Mura offset chip by the first communication interface;

Step S207: The Mura offset chip transfers the second data to a second I/O interface by a second communication interface, and stored in the second memory unit by the second I/O interface.

The Mura offset chip includes a first communication interface, the first memory unit includes a first I/O interface and a first protection interface, the connector includes a data input interface and a I/O control interface; the first communication interface and the first I/O interface are connected; the data input interface is connected to the first communication interface and the first I/O interface; the I/O control interface and the first protection interface are connected.

The Mura offset chip further includes a second communication interface, the second memory unit includes a second I/O interface and a second protection interface, the second communication interface and the second I/O interface are connected, the I/O control interface is connected to the second protection interface by the control circuit, the control circuit is applied to control the first memory unit and the second memory unit that are in different modes.

The control circuit includes a transistor, a first resistance and a second resistance, the transistor comprises a grid electrode, a source electrode and a drain electrode, the grid electrode and the I/O control interface are connected; the source electrode is applied to receive control signals of a first electrical level; one end of the first resistance and the source electrode are connected, the other end is connected to the I/O control interface; the drain electrode and the second protection interface are connected; one end of the second resistance is connected to the drain electrode and the second protection interface, the other end is connected to ground.

The transistor is a P-type metal-oxide-semiconductor field-effect transistor.

The first I/O interface is applied to transfer the first data to the first memory unit; the first protection interface is applied to receive control signals of the first electrical level or a second electrical level, when the first protection interface receives control signals of the first electrical level, the first memory unit is editable, when the first protection interface receives control signals of the second electrical level, the first memory unit is read-only.

When the I/O control interface exports control signals of the first electrical level, the first memory unit is editable, the second memory unit is read-only; the data input interface inputs first data, the first data is stored into the first memory unit by the first I/O interface.

The second I/O interface is applied to transfer the second data to the second memory unit; the second protection interface is applied to receive control signals of the first electrical level or the second electrical level, when the second protection interface receives control signals of the first electrical level, the second memory unit is editable, when the second protection interface receives control signals of the second electrical level, the second memory unit is read-only.

When the I/O control interface exports control signals of the second electrical level, the first memory unit is read-only, the second memory unit is editable; the data input interface receives second data, the second data is transferred to the Mura offset chip by the first communication interface, and exported to the second I/O interface by the second communication interface, and stored in the second memory unit by the second I/O interface.

Similarly, specific executions of each step of the Mura offset data input method according to the exemplary embodiment can also refer to description of the device shown in FIG. 4, hence details are glossed over.

The connector is set to be connected with the first memory unit electrically by the Mura offset data input device, and the Mura offset data input device is connected to the second memory unit electrically by the control circuit, the control circuit is applied to control the first memory unit and the second memory unit that are in different modes, first data is stored into the first memory unit by the connector when the first memory unit is editable, second data is stored in the second memory unit by the Mura offset chip when the second memory unit is editable, which can reapply the connector and simplify the structure of the Mura offset data input device as well as the process of inputting Mura offset data, resulting in improving efficiency of data input and cutting costs of manufacture.

Above are embodiments of the present invention, which does not limit the scope of the present invention. It is understandable in practical to the person who is skilled in the art that all or portion of the processes in the method according to the aforesaid embodiment can be understood. Any modifications, equivalent replacements or improvements within the spirit and principles of the embodiment described above should be covered by the protected scope of the invention.

What is claimed is:

1. A Mura offset data input device, comprising a Mura offset chip, a first memory unit and a second memory unit, a connector, and a control circuit, wherein the Mura offset chip is connected to the first memory unit, the second memory unit and the connector electrically, the connector and the first memory unit are connected electrically, the connector and the second memory unit are indirectly connected through the control circuit, each of the first memory unit and the second memory unit comprises two operation modes including an editable mode and a read-only mode, the control circuit is configured to control the first memory unit and the second memory unit into alternative modes of the two operation modes based upon an input control signal, and the connector is configured to transfer a first data to the first memory unit when the first memory unit is in the editable mode and to transfer a second data to the second memory unit through the Mura offset chip when the second memory unit is in the editable mode.

2. The device according to claim 1, wherein the Mura offset chip comprises a first communication interface, the first memory unit comprises a first I/O interface and a first protection interface, the connector comprises a data input interface and an I/O control interface, the first communication interface and the first I/O interface are connected, the data input interface is connected to the first communication interface and the first I/O interface, and the I/O control interface and the first protection interface are connected.

3. The device according to claim 2, wherein the Mura offset chip further comprises a second communication interface, the second memory unit comprises a second I/O interface and a second protection interface, the second communication interface and the second I/O interface are connected, and the I/O control interface is connected to the second protection interface through the control circuit.

4. The device according to claim 3, wherein the control circuit comprises a transistor, a first resistance and a second resistance; the transistor comprises a gate electrode, a source electrode and a drain electrode; the gate electrode and the I/O control interface are connected; the source electrode is applied to receive the input control signal; one end of the first resistance and the source electrode are connected, and the other end of the first resistance is connected to the I/O control interface; the drain electrode and the second protection interface are connected; one end of the second resistance is connected to the drain electrode and the second protection interface, and the other end of the second resistance is connected to ground.

5. The device according to claim 4, wherein the transistor is a P-type metal-oxide-semiconductor field-effect transistor.

6. The device according to claim 3, wherein the first I/O interface is applied to transfer the first data to the first memory unit; the first protection interface is applied to receive a control signal; when the first protection interface receives a control signal of a first electrical level, the first memory unit is editable; when the first protection interface receives a control signal of a second electrical level, the first memory unit is read-only.

7. The device according to claim 6, wherein when the I/O control interface outputs the input control signal of the first electrical level, the first memory unit is editable, the second memory unit is read-only, the data input interface inputs the first data, and the first data is stored into the first memory unit through the first I/O interface.

8. The device according to claim 3, wherein the second I/O interface is applied to transfer the second data to the second memory unit; the second protection interface is applied to receive a control signal; when the second protection interface receives a control signal of a first electrical level, the second memory unit is editable; when the second protection interface receives a control signal of a second electrical level, the second memory unit is read-only.

9. The device according to claim 8, wherein when the I/O control interface outputs the input control signal of the second electrical level, the first memory unit is read-only, the second memory unit is editable, and the data input interface inputs the second data, which is transferred to the Mura offset chip through the first communication interface, exported to the second I/O interface through the second communication interface, and stored in the second memory unit through the second I/O interface.

10. A method of inputting Mura offset data, comprising:
exporting a first input control signal of a first electrical level by an I/O control interface of a connector, so as to manipulate a first memory unit to be editable;
converting the first input control signal of the first electrical level to a control signal of a second electrical level by a control circuit, so as to manipulate a second memory unit to be read-only;
inputting a first data from a data input interface of the connector, and storing the first data into the first memory unit through a first I/O interface of the first memory unit;
exporting a second input control signal of the second electrical level the I/O control interface of the connector, so as to manipulate the first memory unit to be read-only;
converting the second input control signal of the second electrical level to a control signal of the first electrical level the control circuit, so as to manipulate the second memory unit to be editable;
inputting a second data from the data input interface of the connector, and transferring the second data to a Mura offset chip through a first communication interface of the Mura offset chip; and
exporting the second data to a second I/O interface of the second memory unit through a second communication interface of the Mura offset chip, and storing the second data in the second memory unit through the second I/O interface.

11. The method according to claim 10, wherein the Mura offset chip comprises the first communication interface, the first memory unit comprises the first I/O interface and a first protection interface, the connector comprises the data input interface and the I/O control interface, the first communication interface and the first I/O interface are connected, the data input interface is connected to the first communication interface and the first I/O interface, and the I/O control interface and the first protection interface are connected.

12. The method according to claim 11, wherein the Mura offset chip further comprises the second communication interface, the second memory unit comprises the second I/O interface and a second protection interface, the second communication interface and the second I/O interface are connected, the I/O control interface is connected to the second protection interface by the control circuit, and the control circuit is applied to control the first memory unit and the second memory unit into alternative modes of two different operation modes based upon one of the first and the second input control signals.

13. The method according to claim 12, wherein the control circuit comprises a transistor, a first resistance and a second resistance; the transistor comprises a gate grid electrode, a source electrode and a drain electrode; the gate electrode and the I/O control interface are connected; the source electrode is applied to receive the first and the second input control signals; one end of the first resistance and the source electrode are connected, and the other end of the first resistance is connected to the I/O control interface; the drain electrode and the second protection interface are connected; one end of the second resistance is connected to the drain electrode and the second protection interface, and the other end of the second resistance is connected to ground.

14. The method according to claim 13, wherein the transistor is a P-type metal-oxide-semiconductor field-effect transistor.

15. The method according to claim 12, wherein the first I/O interface is applied to transfer the first data to the first memory unit; the first protection interface is applied to receive the control signal; when the first protection interface receives the control signal of the first electrical level, the first memory unit is editable; when the first protection interface receives the control signal of the second electrical level, the first memory unit is read-only.

16. The method according to claim 15, wherein when the I/O control interface exports the first input control signal of the first electrical level, the first memory unit is editable, the second memory unit is read-only, the data input interface inputs the first data, and the first data is stored into the first memory unit through the first I/O interface.

17. The method according to claim 12, wherein the second I/O interface is applied to transfer the second data to the second memory unit; the second protection interface is applied to receive the control signal; when the second protection interface receives the control signal of the first electrical level, the second memory unit is editable; when the second protection interface receives the control signal of the second electrical level, the second memory unit is read-only.

18. The method according to claim 17, wherein when the I/O control interface exports the second input control signal of the second electrical level, the first memory unit is read-only, the second memory unit is editable, and the data input interface receives the second data, which is transferred to the Mura offset chip through the first communication interface, exported to the second I/O interface through the second communication interface, and stored in the second memory unit through the second I/O interface.

* * * * *